United States Patent
Vargantwar et al.

(10) Patent No.: US 8,767,572 B1
(45) Date of Patent: Jul. 1, 2014

(54) METHODS AND SYSTEMS FOR REQUESTING FORWARD-LINK DATA RATES

(75) Inventors: Sachin R. Vargantwar, Overland Park, KS (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 636 days.

(21) Appl. No.: 13/109,243

(22) Filed: May 17, 2011

(51) Int. Cl.
*H04L 12/26* (2006.01)

(52) U.S. Cl.
USPC .................. 370/252; 370/329; 370/465

(58) Field of Classification Search
USPC .......... 370/252, 328, 329, 331, 332, 464, 465
See application file for complete search history.

(56) References Cited

U.S. PATENT DOCUMENTS

| | | | |
|---|---|---|---|
| 7,130,311 B2 * | 10/2006 | Yavuz et al. | 370/468 |
| 7,486,645 B2 * | 2/2009 | Li et al. | 370/335 |
| 2002/0036994 A1 * | 3/2002 | Huh et al. | 370/329 |

OTHER PUBLICATIONS

Bi, Qi, A Forward Link Performance Study of the 1xEV-DO Rev. 0 System Using Field Measurements and Simulations, Mar. 2004, Lucent.*

* cited by examiner

*Primary Examiner* — Michael Thier
*Assistant Examiner* — Feben M Haile (57) ABSTRACT

Disclosed herein are methods and systems according to which an access terminal intelligently accounts for differences in respective distances between itself and various access nodes, so as to more accurately estimate the C/I ratio of signals received from a serving access node. According to the method, the access terminal calculates a delta of (i) a serving distance between the access terminal and the serving access node and (ii) a neighboring distance between the access terminal and a neighboring access node. The access terminal then selects a C/I-evaluation time period based at least in part on the calculated delta, which may generally be used by the access terminal to select the C/I-evaluation time period such that this time period only includes time during which the access terminal is likely to have received signals emitted by both the serving access node and the neighboring access node.

22 Claims, 5 Drawing Sheets

METHODS AND SYSTEMS FOR REQUESTING FORWARD-LINK DATA RATES

BACKGROUND

1. Wireless-Communication Networks Generally

Many people use mobile devices, such as cell phones and personal digital assistants (PDAs), to communicate with wireless-communication networks. Mobile devices and wireless-communication networks typically communicate with each other over a radio-frequency (RF) air interface according to a wireless-communication protocol. One example of such a wireless-communication protocol is Code Division Multiple Access (CDMA). Additional examples of wireless-communication protocols include WiMAX, LTE, IDEN, GSM, WIFI, and HDSPA.

Mobile devices typically conduct these communications with one or more base transceiver stations (BTSs), which send communications to and receive communications from mobile devices over the air interface via carrier signals. Each BTS is typically in turn communicatively connected with an entity known as a base station controller (BSC), which (a) controls one or more BTSs and (b) acts as a conduit between the BTS(s) and one or more switches or gateways, such as a mobile switching center (MSC) and/or a packet data serving node (PDSN), which may in turn interface with one or more signaling and/or transport networks. Thus, a mobile device may communicate with one or more remote devices via one or more such networks by sending communications, perhaps in the form of data packets, by way of a BTS. Communications from a BTS to a mobile device are typically referred to as "forward link" communications, whereas communications from a mobile device to a BTS are typically referred to as "reverse link" communications.

According to a particular type of CDMA protocol known as EV-DO, which stands for "Evolution Data Optimized," networks provide service to mobile devices using a combination of time-division multiplexing (TDM) on the forward link and more-conventional CDMA technology on the reverse link. In the EV-DO context, a mobile device is typically referred to as an access terminal, while the network entity with which the access terminal communicates over the air interface is known as an access node. Such an access node may include a system of network devices, and typically includes a network entity known as a radio network controller (RNC), which is similar to a BSC.

In the balance of this written description, reference may be made to access terminals as examples of mobile devices, though this is for purposes of explanation and not to the exclusion of any other type of mobile device. Further, reference may be made to access nodes as examples of network entities with which an access terminal may communicate over an air interface, though this too is for explanation and not to the exclusion of any other type of network entity such as, but not limited to, a BTS. A particular access node with which an access terminal communicates may be referred to as a serving access node. Other access nodes in the wireless-communication network may be referred to as neighboring access nodes.

More generally, those of skill in the art will appreciate that aspects of this disclosure may be applied to various wireless-communication networks regardless of the particular configurations of such networks, and regardless of the particular wireless-communication protocols used by such networks.

2. Forward-Link Data Rate

As described above, communication between a serving access node and an access terminal may involve the serving access node sending packets to the access terminal on the forward link, and the access terminal sending packets to the serving access node on the reverse link. Focusing on the forward link, serving access nodes are generally able to transmit packets to access terminals at a number of different forward-link data rates. The particular forward-link data rates used by a serving access node may vary depending on, for example, the particular wireless-communication protocol according to which the access node operates. In the context of EV-DO, available forward-link data rates may be specified (i.e., represented) by—or at least associated with—particular data-rate control (DRC) values.

In some arrangements, an access terminal may be capable of requesting that a serving access node use a particular forward-link data rate for sending communications to the access terminal. In such arrangements, the access terminal may select a requested forward-link data rate based at least in part on an estimated carrier-to-interference (C/I) ratio of a signal received from the serving access node.

Generally, a C/I ratio provides an indication of the power of the signal received from the serving access node relative to the total power of interfering signals received from other transmitters, such as other access nodes in the wireless-communication network and/or any other transmitters, whether part of the same wireless-communication network or not. In typical arrangements, an access terminal may measure—at regular time intervals during a pre-determined recurring time period—the power of the signal received from the serving access node and the power of interfering signals received from, e.g., neighboring access nodes, and accordingly derive C/I measurements.

Such measurements may be used by the access terminal to estimate the C/I ratio of the signal emitted by the serving access node, as received by the access terminal. And it should be noted that the examples described herein that involve C/I ratios being determined in a manner where the "I" involves only signals from neighboring access nodes in the same network are used for clarity of presentation, and are not meant to imply that other types of interfering signals would not also or instead be relevant in other contexts.

In some arrangements, the pre-determined time period during which the access terminal makes C/I measurements may correspond to a coordinated "pilot-burst" time period, during which access nodes in the wireless-communication network emit a pilot signal. Such a pilot-burst time period may be specified by the particular wireless-communication protocol according to which the wireless-communication network operates.

Generally, pilot signals are used by access nodes to convey certain control, synchronization, and/or reference information to access terminals. However, pilot signals may also be used by access terminals for C/I estimation. According to some wireless-communication protocols, in particular some of those involving TDMA communications, access nodes transmit only pilot signals during the specified pilot-burst time period. Therefore, during the pilot-burst time period, C/I estimation may be carried out by the access terminal in the presence of only pilot signals emitted by the serving access node and neighboring access nodes. Accordingly, during such coordinated periods, access terminals may estimate C/I conditions in a relatively more rapid and/or accurate manner than may be possible, for example, during time periods of normal network communications.

An access terminal may be arranged to associate particular C/I ratios with respective particular forward-link data rates. Accordingly, the access terminal may be arranged to request a forward-link data rate associated with an estimated C/I ratio. For example, in situations where the estimated C/I ratio is relatively low, indicating relatively high interference conditions, the access terminal might request a relatively low forward-link data rate, typically better enabling the access terminal to demodulate signals received from the serving access node.

Generally, demodulation at a relatively low rate enables an access terminal to extract information of interest from the carrier signal in a manner that is less error-prone, i.e. necessitating fewer (and perhaps no) retransmissions of data, than demodulation at a relatively high rate, particularly in the presence of high-interference conditions. Conversely, and other things being (substantially) equal, in relatively low-interference conditions (high C/I ratio), an access terminal may request a relatively high forward-link data rate. On the one hand, it may be generally desirable for an access terminal to request a relatively high forward-link data rate, so as to receive data from the wireless-communication network at a high rate. On the other hand, however, use of a forward-link data rate that is unsuitably high for prevailing interference conditions typically tends to result in an increased incidence of errors in the demodulation of packets received by the access terminal, and thus a decrease in the effective rate of receiving data that—as a practical matter—is actually experienced by the access terminal.

As a general matter, it is quite typically the case that some of the packets received by an access terminal from an access node will contain errors, while some will not. A ratio can be computed between (i) the number of error-containing packets received by the access terminal (and perhaps a number of packets not received at all) from the access node over a given time period and (ii) the total number of packets received (or that should have been received) by the access terminal from the access node over that same time period. This ratio is known as the forward-link packet error rate (FPER). Generally, an access terminal may be arranged to request a forward-link data rate that corresponds to a desirable balance of data rate and error rate.

OVERVIEW

As discussed above, one factor that may cause an access terminal to experience an increased FPER is the use of an undesirably high forward-link data rate (as transmitted by the access node, as opposed to as effectively received at the access terminal). As also discussed above, the access terminal may request a particular forward-link data rate based, at least in part, on an estimated C/I ratio of a signal received from a serving access node. Thus, it is possible that the access terminal may request an undesirably high forward-link data rate as a result of an inaccurate underestimation of a C/I ratio. Generally, therefore, the access terminal may help increase the likelihood of the requested forward-link data rate being actually desirable by accurately estimating the C/I ratio of signals received from the serving access node. In other words, it is desirable that access terminals avoid the so-called "garbage in, garbage out" (inaccurate C/I estimation in, undesirable requested forward-link data rate out) problem in at least this context.

One potential source of inaccuracy in estimating C/I ratios can be differences in respective distances between the access terminal and various access nodes in the wireless-communication network. For instance, a distance between the access terminal and the serving access node may be different than a respective distance between the access terminal and one or more neighboring access nodes. As a result, the amount of time that it takes a pilot signal emitted by the serving access node to reach the access terminal may differ from the amount of time that it takes a respective pilot signal (which would be considered, in this context, an interfering signal) emitted by one or more neighboring access nodes to reach the access terminal.

As noted above, access nodes may be arranged to emit pilot signals at a pre-determined time (perhaps according to a pre-defined pilot-burst time period) and, the access terminal may be arranged to perform C/I measurements during a corresponding period of time. However, due to the different respective time delays in receipt of signals emitted by various access nodes, such pilot signals may not arrive at the access terminal at the same time.

In other words, it is possible that the access terminal may receive the pilot signal emitted by the serving access node before it has received all interfering pilot signals emitted by neighboring access nodes. It is therefore possible that the access terminal may estimate a C/I ratio based on C/I measurements taken when the pilot signal emitted by the serving access node has been received, but all interfering pilot signals have not. If the access terminal were to use such C/I measurements to estimate the C/I ratio, the access terminal may underestimate the true total power of interfering pilot signals emitted by neighboring access nodes. As a result, the access terminal may overestimate the C/I ratio and, ultimately, may request an undesirably high forward-link data rate. Because the access node may not be aware that the requested forward-link data rate is undesirably high (and there may not be another safeguard in place against such an issue), the access node may grant such a request, leading to use of an undesirably high forward-link data rate by the access terminal, and to the typically resultant problems described above, and/or one or more other problems.

Disclosed herein are methods and systems according to which an access terminal intelligently accounts for differences in respective distances between itself and various access nodes, so as to more accurately estimate the C/I ratio of signals received from a serving access node. According to at least one embodiment taking the form of a method, the access terminal calculates a delta of (i) a serving distance between the access terminal and the serving access node and (ii) a neighboring distance between the access terminal and a neighboring access node. The access terminal then selects a C/I-evaluation time period based at least in part on the calculated delta. Generally, the calculated delta may be used by the access terminal to identify a period of time during which the access terminal is likely to have received signals emitted by both the serving access node and the neighboring access node. Accordingly, the access terminal may select the C/I-evaluation time period so that it only includes time during which the access terminal is likely to have received signals emitted by both the serving access node and the neighboring access node.

The access terminal may then determine an estimated C/I ratio of the signal received from the serving access node based at least in part on one or more C/I measurements taken by the access terminal during the C/I-evaluation time period, and not based on any C/I measurement taken by the access terminal at a time other than during the C/I-evaluation time period. As a result, the access terminal may determine the estimated C/I ratio based only on C/I measurements taken by the access terminal at a time when the access terminal has received—or is at least likely to have received—signals emitted by both the serving access node and the neighboring access node.

Ultimately, the access terminal may select a forward-link data rate based on the estimated C/I ratio, and further may request forward-link service from the serving access node at the selected forward-link data rate. In this way, the access terminal may help increase the likelihood of the requested forward-link data rate being a desirable one, at least in part by estimating the C/I ratio of a signal received from the serving access node in a manner that may generally be more accurate than other techniques.

These, as well as other, aspects and advantages will become apparent to those of ordinary skill in the art by reading the following detailed description, with reference where appropriate to the accompanying drawings.

DETAILED DESCRIPTION

1. Examples of Architecture a. Example Communication System

Figure 1:
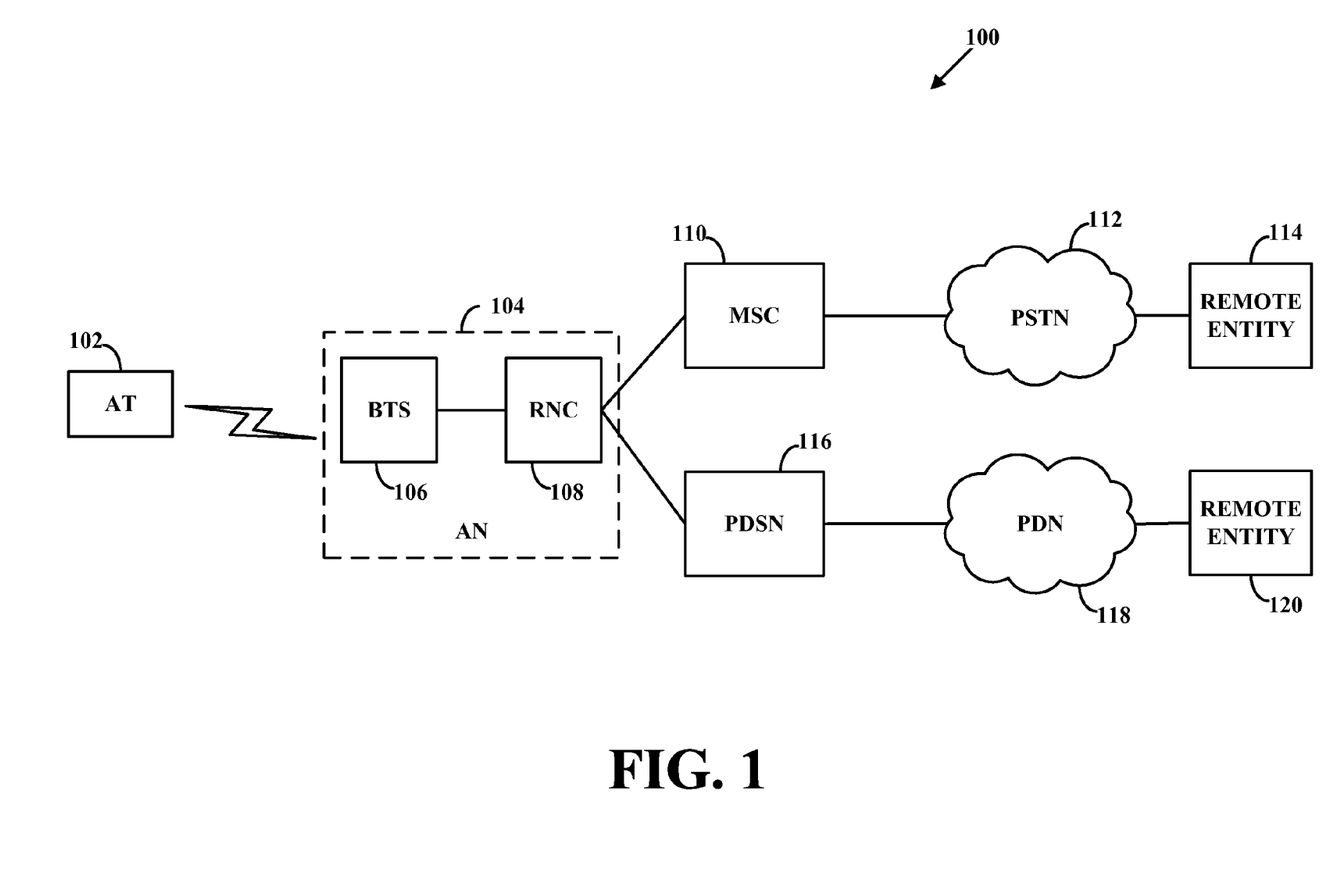
FIG. 1 is a simplified block diagram of an example communication system in which at least one embodiment could be implemented.

FIG. 1 is a simplified block diagram of an example communication system in which at least one embodiment can be implemented. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components, or in conjunction with other components, and in any suitable combination and location. Various functions described herein as being performed by one or more entities may be carried out by hardware, firmware, and/or software— some may be carried out by a processor executing instructions stored in memory.

As shown in FIG. 1, example communication system 100 includes access terminal (AT) 102, access node (AN) 104 (shown as comprising base transceiver station (BTS) 106 and radio network controller (RNC) 108), mobile switching center (MSC) 110, public switched telephone network (PSTN) 112, packet data serving node (PDSN) 116, and packet-data network (PDN) 118. Additional entities could be present as well or instead. For example, there could be additional access terminals in communication with BTS 106; furthermore, there could be additional entities in communication with PSTN 112 and/or PDN 118. Also, there could be one or more devices and/or networks making up at least part of one or more of the communication links. For example, there could be one or more routers, switches, or other devices or networks on the link between PDSN 116 and PDN 118.

Access terminal 102 may be any access terminal arranged to carry out the access terminal functions described herein. As such, access terminal 102 may include a user interface, a wireless-communication interface, a processor, and data storage comprising instructions executable by the processor for carrying out those access terminal functions. Access terminal 102 is further described below in connection with FIG. 2.

BTS 106 may be any network element arranged to carry out the BTS functions described herein. As such, BTS 106 may include a communication interface, a processor, and data storage comprising instructions executable by the processor to carry out those BTS functions. The communication interface may include one or more antennas, chipsets, and/or other components for providing one or more wireless-coverage areas such as cells and sectors, for communicating with access terminals, such as access terminal 102, over an air interface. The communication interface may be arranged to communicate according to one or more communication protocols mentioned herein and/or any others now known or later developed. The communication interface may also include one or more wired and/or wireless interfaces for communicating with at least RNC 108.

RNC 108 may be any network element arranged to carry out the RNC functions described herein. As such, RNC 108 may include a communication interface, a processor, and data storage comprising instructions executable by the processor to carry out those RNC functions. The communication interface may include one or more wired and/or wireless interfaces for communicating with at least BTS 106, MSC 110, and PDSN 116. In general, RNC 108 functions to control one or more BTSs such as BTS 106, and to provide one or more BTSs such as BTS 106 with connections to other devices such as MSC 110 and PDSN 116.

MSC 110 may be any networking element arranged to carry out the MSC functions described herein. As such, MSC 110 may include a communication interface, a processor, and data storage comprising instructions executable by the processor to carry out those MSC functions. The communication interface may include one or more wired and/or wireless interfaces for communicating with at least RNC 108 and PSTN 112. In general, MSC 110 functions as a switching element between PSTN 112 and one or more RNCs such as RNC 108, facilitating communication between access terminals and PSTN 112, which may be the well-known public switched telephone network. With this arrangement, access terminal 102 may communicate with remote entity 114 through a communication path comprising BTS 106, RNC 108, MSC 110, and PSTN 112. Remote entity 114 may be, for example, a remote telephone device.

PDSN 116 may be any networking element arranged to carry out the PDSN functions described herein. As such, PDSN 116 may include a communication interface, a processor, and data storage comprising instructions executable by the processor for carrying out those PDSN functions. The communication interface may include one or more wired and/or wireless interfaces for communicating with at least RNC 108 and PDN 118. In general, PDSN 116 functions as a network access server between PDN 118 and RNCs such as RNC 108, facilitating packet-data communication between access terminals and PDN 118. With this arrangement access terminal 102 may communicate with remote entity 120 through a communication path comprising BTS 106, RNC 108, PDSN 116, and PDN 118. Remote entity 120 may be, for example, a remote computer.

PDN 118 may include one or more wide area networks, one or more local area networks, one or more public networks such as the Internet, one or more private networks, one or more wired networks, one or more wireless networks, and/or one or more networks of any other type. In one example, PDN 118 may include both the Internet and a private core packet-data network operated by a wireless carrier that operates BTS 106, RNC 108, etc. Devices in communication with PDN 118 may exchange data using a packet-switched protocol such as the Internet Protocol (IP), and may be identified by an address such as an IP address.

b. Example Access Terminal

Figure 2:
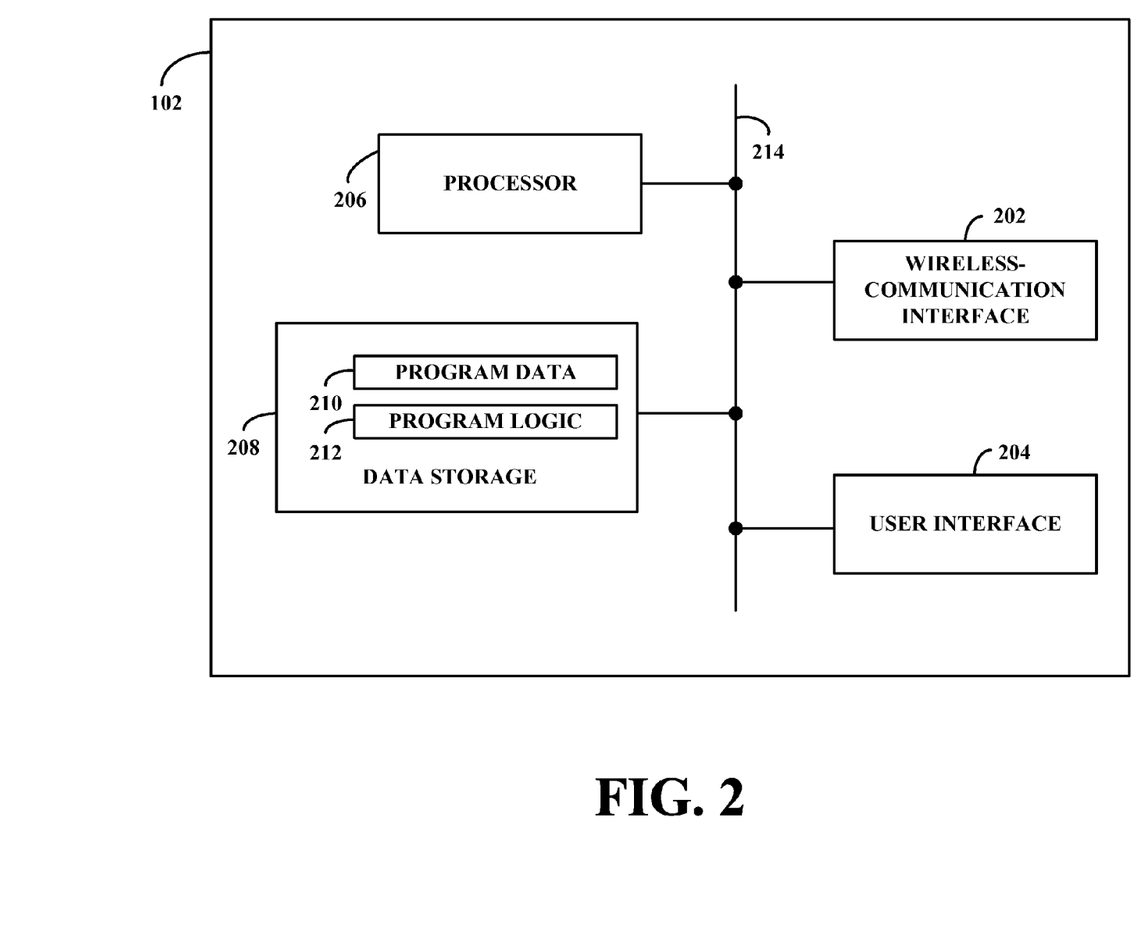
FIG. 2 is a simplified block diagram of an access terminal arranged to implement aspects of at least one embodiment.

FIG. 2 is a simplified block diagram of an access terminal arranged to implement at least one embodiment. As shown, access terminal 102 includes a wireless-communication interface 202, a user interface 204, a processor 206, and data storage 208, all of which may be communicatively linked together by a system bus, network, and/or other connection mechanism 214.

Wireless-communication interface 202 functions to facilitate air-interface communication with BTS 106. Wireless-communication interface 202 may comprise an antenna and a chipset for communicating with one or more BTSs over an air interface. As an example, the chipset could be one that is suitable for CDMA communication, including EV-DO communication. The chipset or wireless-communication interface in general may also or instead be arranged to communicate according to one or more other types of wireless communication (e.g. wireless-communication protocols) mentioned herein and/or any others now known or later developed.

User interface 204 may include one or more components for receiving input from a user of access terminal 102, as well as one or more components for providing output to a user of access terminal 102. User interface 204 may include buttons, a touchscreen, a microphone, and/or any other elements for receiving inputs, as well as a speaker, one or more displays, and/or any other elements for communicating outputs. Further, user interface 204 may include analog/digital conversion circuitry to facilitate conversion between analog user input/output and digital signals with which access terminal 102 can operate.

Processor 206 may comprise one or more general-purpose processors (such as INTEL processors or the like) and/or one or more special-purpose processors (such as digital-signal processors or application-specific integrated circuits). To the extent processor 206 includes more than one processor, such processors could work separately or in combination. Further, processor 206 may be integrated in whole or in part with wireless-communication interface 202 and/or with other components.

Data storage 208, in turn, may comprise one or more volatile and/or non-volatile storage components, such as magnetic, optical, or organic memory components. As shown, data storage 208 may include program data 210 and program logic 212 executable by processor 204 to carry out various access-terminal functions. Although these components are described herein as separate data-storage elements, they could just as well be physically integrated together or distributed in various other ways. For example, program data 210 may be maintained in data storage 208 separate from program logic 212, for easy updating and reference by program logic 212.

Program data 210 may include various other data used by access terminal 102 in operation. As an example, program data 210 may include data-rate data that correlates particular forward-link data rates with particular C/I ratios. As another example, program data 210 may include FPER-threshold data that may be used, by comparison with calculated FPERs, to determine that it may be desirable to estimate a C/I ratio in accordance with at least one embodiment. As another example still, program data 210 may include distance-delta-threshold data that specifies various distance-delta thresholds that may be used, by comparison with calculated distance deltas, to determine that it is desirable to estimate a C/I ratio in accordance with at least one embodiment. Other examples of program data are possible as well. Program data 210 is discussed further below.

Any such data may be stored by access terminal 102 together in the same data table in program data 210. Alternatively, such data may be stored separately in separate data tables in program data 210. Of course, many other examples and ways of organizing program data 210 may be possible as well.

2. Example Operation

Figure 3:
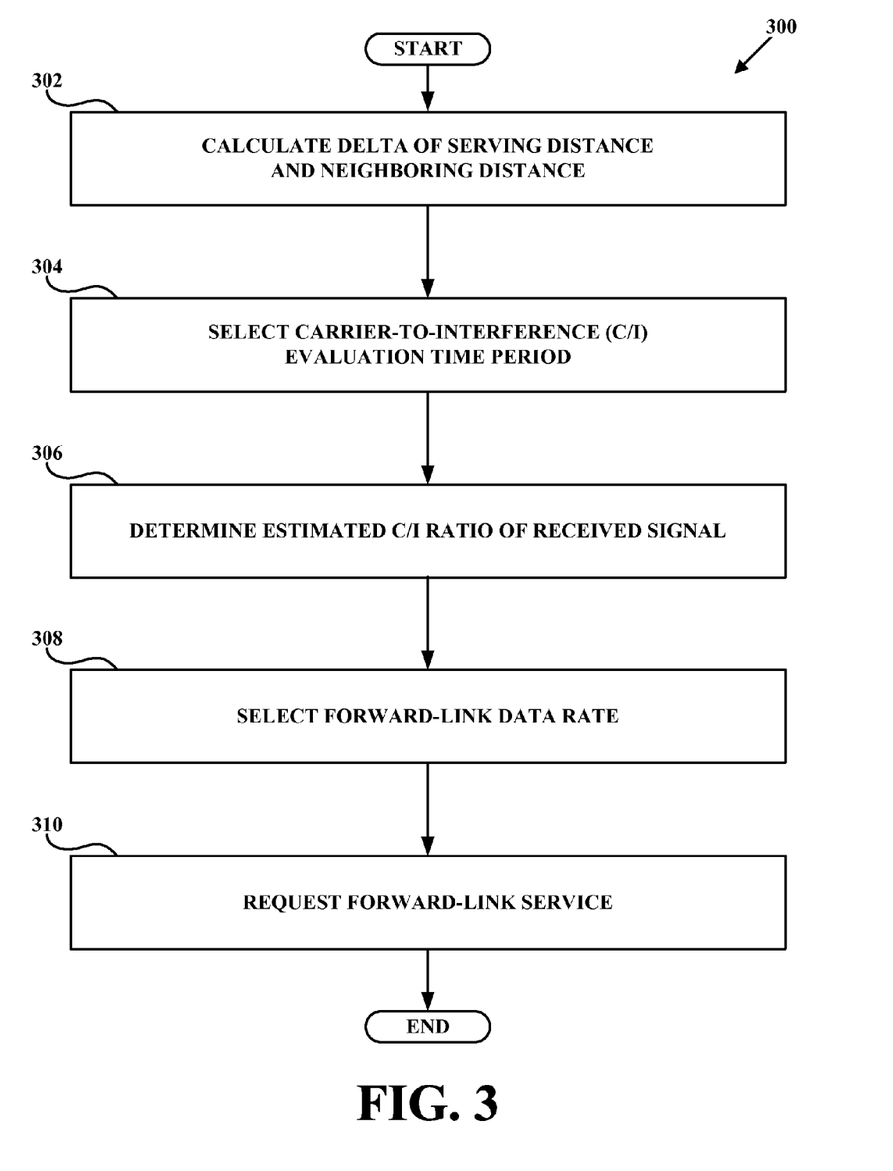
FIG. 3 is a flowchart depicting functions that can be carried out in accordance with at least one embodiment.

FIG. 3 is a flowchart depicting functions that can be carried out in accordance with at least one embodiment. Generally, these functions may be carried out in a wireless-communication network by an access terminal, such as access terminal 102, that is being served by a serving access node. The wireless-communication network may additionally include one or more neighboring access nodes. For example, and with reference to FIG. 4, method 300 may be carried out by access terminal 102 in wireless-communication network 400 which includes serving access node 402, as well as neighboring access nodes 404A, 404B, and 404C. It should be understood that wireless-communication network 400 is set forth for purposes of example and explanation only, and should not be taken to be limiting. One or more embodiments may just as well be carried out in other wireless-communication networks having other arrangements.

As shown in FIG. 3, method 300 begins at step 302 when access terminal 102 calculates a delta of (i) a serving distance between the access terminal and the serving access node and (ii) a neighboring distance between the access terminal and the neighboring access node. At step 304, access terminal 102 selects a carrier-to-interference (C/I)-evaluation time period based at least in part on the calculated delta. At step 306, access terminal 102 determines an estimated C/I ratio of a signal received from the serving access node based at least in part on one or more C/I measurements taken by the access terminal during the C/I-evaluation time period, and not based on any C/I measurement taken by the access terminal at a time other than during the C/I-evaluation time period. At step 308, access terminal 102 selects a forward-link data rate based at least in part on the estimated C/I ratio. And at step 310, access terminal 102 requests forward-link service from the serving access node at the selected forward-link data rate. These steps are further explained below.

Figure 4:
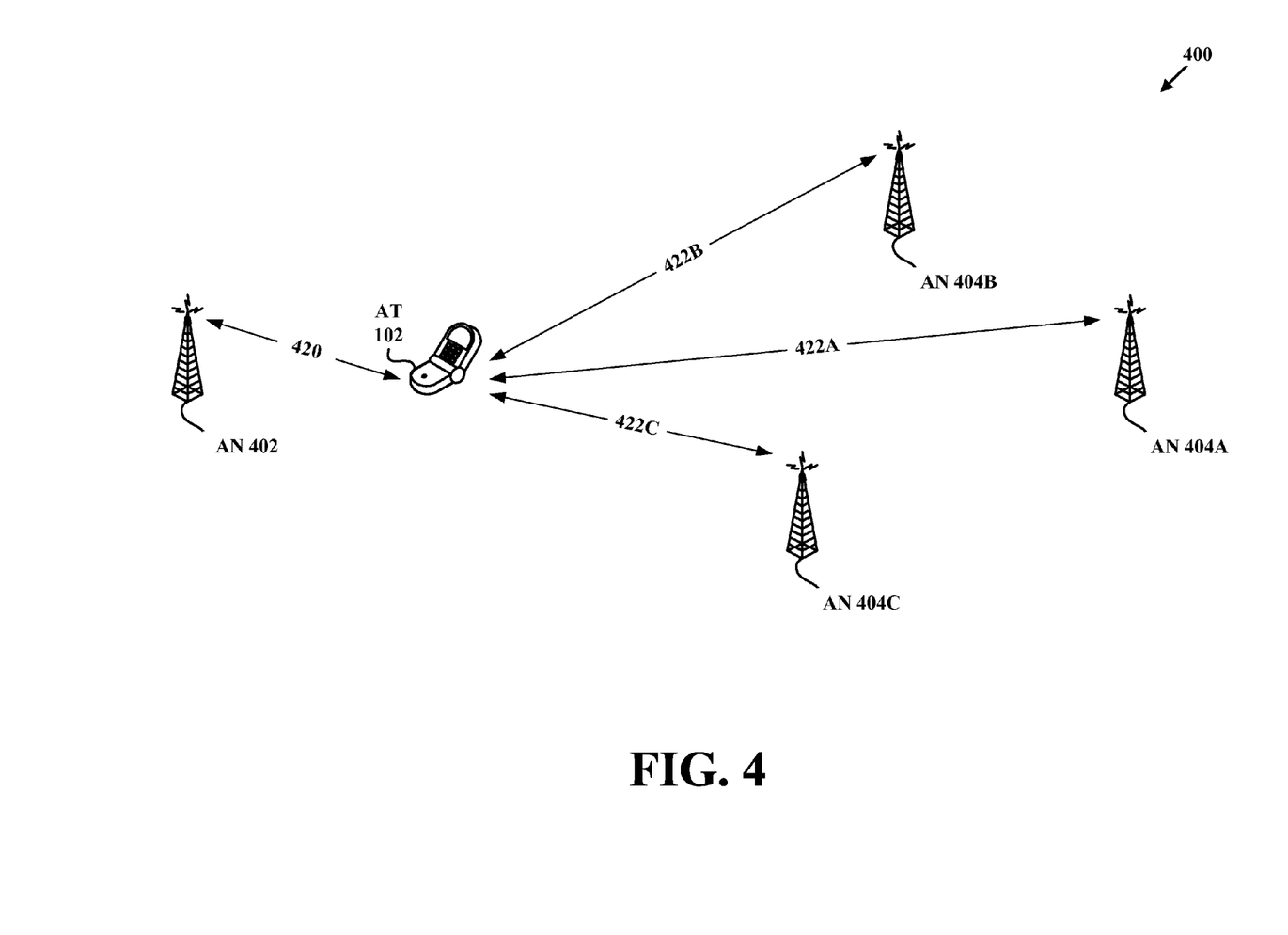
FIG. 4 is a simplified block diagram of an access terminal in an example wireless-communication network, in accordance with at least one embodiment.

As noted above, one or more embodiments may enable access terminal 102 to account for differences in respective distances between access terminal 102 and various access nodes such as serving access node 402 and neighboring access nodes 404A, 404B, and 404C, so as to more accurately estimate the C/I ratio of signals received from serving access node 402. Before turning to a more-detailed description of method 300, brief reference to FIG. 5 provides an overview of some concepts that are relevant to method 300.

Figure 5:
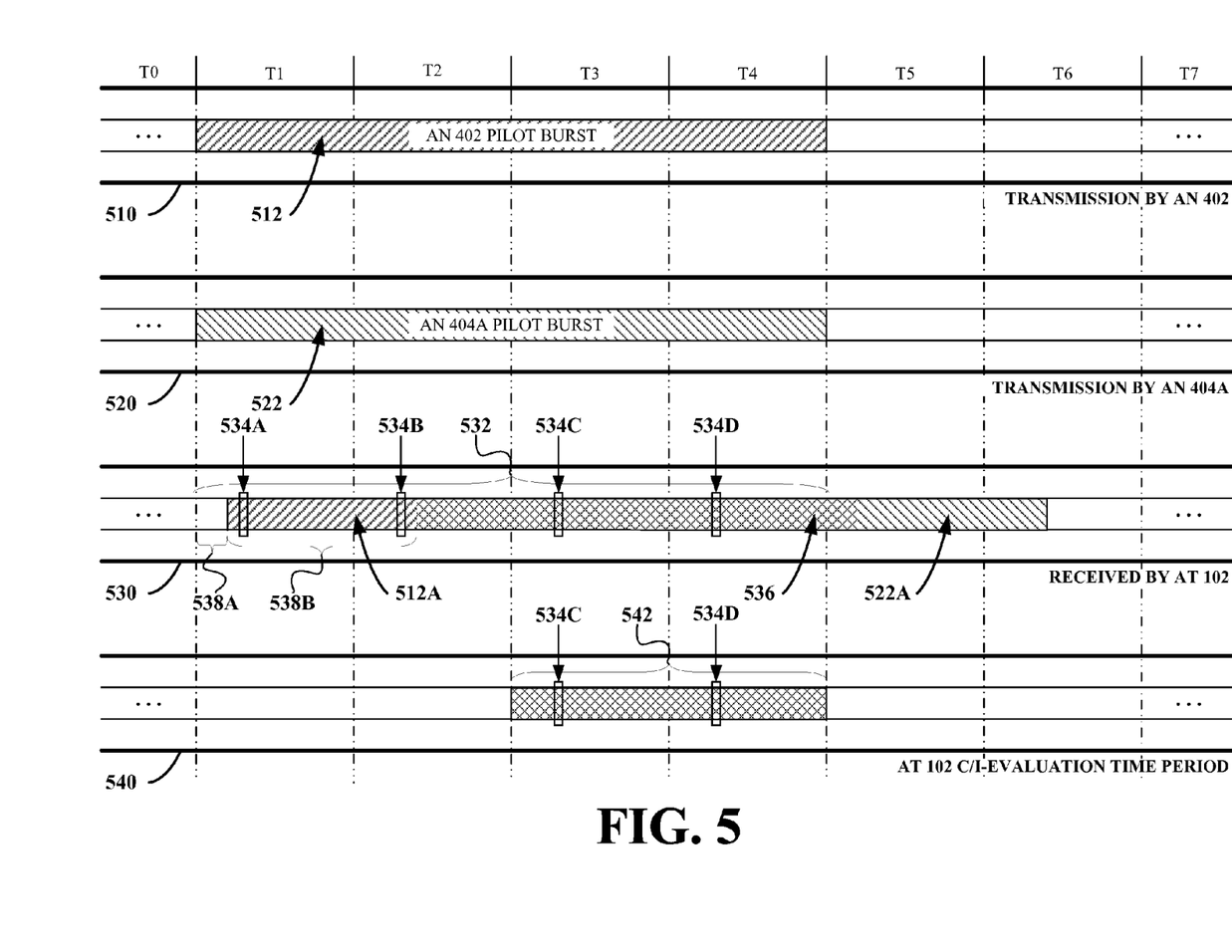
FIG. 5 depicts various timing diagrams, in accordance with at least one embodiment.

FIG. 5 depicts a number of time slots T0-T7 which, taken together, reflect that wireless-communication network 400, including access terminal 102, and access nodes 402, 404A, 404B, and 404C, operates in a time-synchronized manner. It should be understood that such time slots are shown for purposes of example and explanation only, and are not necessarily intended to be representative of actual time slots of any particular wireless-communication protocol. Instead, FIG. 5 depicts, among other concepts, the concept of transmission and receipt of particular signals, in this case pilot signals, in a time-synchronized manner, for purposes of explanation of method 300. Such concepts may be applied in various wireless-communication networks in accordance with the particular wireless-communication protocols according to which the various wireless-communication networks operate.

FIG. 5 also depicts timing diagrams 510 and 520, which show transmissions by serving access node 402 and neighboring access node 404A, respectively. Note that, during the time period corresponding to time slots T1-T4, serving access node 402 and neighboring access node 404A emit pilot bursts (or pilot signals) 512 and 522, respectively. Correspondingly, as shown by timing diagram 530, access terminal 102 may be configured to make C/I measurements 534A-534D at regular time intervals during default C/I-evaluation time period 532, which has a duration substantially equal to that of the pilot-burst time period of pilot bursts 512 and 522. That is, while default C/I-evaluation time period 532 and the pilot-burst time period of pilot bursts 512 and 522 may not be exactly equally, they may be substantially equal so as to enable access terminal 102 to take C/I measurements while serving access node 402 and neighboring access node 404A emit pilot bursts 512 and 522, respectively.

Note, however, that due to the respective time delay in receipt of the pilot bursts, access terminal 102 does not receive pilot burst 512 from access node 402 until after time delay 538A (as indicated by received transmission 512A, shown as forward slashes). Also, because neighboring distance 422A is greater than serving distance 420, access terminal 102 does not receive pilot burst 522 from access node 404A until after both time delays 538A and 538B (as indicated by received transmissions 536, shown as cross slashes, during which access node 404A receives both pilot burst 512 and 522). Because of the differing time delays of receipt, access terminal 102 continues to receive pilot burst 522 for a period of time after the entirety of pilot burst 512 has been received (as indicated by received transmission 522A, shown as back slashes). Of course, the particular time delays shown in FIG. 5 are for purposes of example and explanation only, and should not be taken to be limiting.

As a result of time delays 538A and 538B, C/I measurements 534A and 534B are taken at times at which access terminal 102 has received pilot burst 512, but has not yet received pilot burst 522. Thus, C/I measurements 534A and 534B may lead access terminal 102 to overestimate the quality of C/I conditions in wireless-communication network 400, as they do not accurately account for interfering pilot burst 522. That is, while the strength of pilot burst 512 is measured during C/I measurements 534A and 534B, the strength of interfering pilot burst 522 is not, and therefore C/I measurements 534A and 534B may provide an inaccurately low indication of the level of interference contributed by neighboring access node 404A. Access terminal 102 may be configured to average (or otherwise coalesce) each of C/I measurements 534A-534D made during default C/I-evaluation time period 532 to determine an estimated C/I ratio of pilot burst 512. Inclusion of C/I measurements 534A and 534B in such an average would result in an erroneously high estimated C/I ratio.

Accordingly, method 300 provides a way for access terminal 102 to identify a C/I-evaluation time period during which all relevant pilot bursts have been received by access terminal 102, and from which access terminal 102 may select C/I measurements to use in determining the estimated C/I ratio. C/I-evaluation time period 542 shown in timing diagram 540 is an example of such a C/I-evaluation time period. Note that access terminal 102 may exclude C/I measurements taken outside of C/I-evaluation time period 542, so as to avoid any inaccuracies that such measurements may inject into the estimated C/I ratio. By more accurately accounting for the strength of received pilot bursts in this way, access terminal 102 may beneficially achieve a more accurate estimation of the quality of the prevailing C/I conditions in wireless-communication network 400.

In order to achieve such a benefit, access terminal 102 may carry out method 300 each time it estimates a C/I ratio. Alternatively, access terminal 102 may carry out method 300 in response to receiving some indication that the C/I ratio has been previously inaccurately estimated. As described above, one such indication that the C/I ratio has been inaccurately estimated may be that the access terminal is experiencing an undesirably high FPER. Thus, access terminal 102 may carry out method 300 in response to first making a determination that the FPER with respect to data received from the serving access node is greater than an FPER threshold. Such an FPER threshold may be set at a value that reflects an FPER that is undesirably high (perhaps as specified by a service provider that manages the wireless-communication network, or perhaps as specified by a user of access terminal 102). As described above, such an FPER threshold may be stored in program data 210 for easy access and reference by access terminal 102.

a. Calculate Delta of Serving Distance and Neighboring Distance

Whether method 300 is employed by access terminal 102 at all times, or in response to making a determination that an FPER threshold has been exceeded, at step 302, access terminal 102 calculates a delta of (i) a serving distance between access terminal 102 and serving access node 402 and (ii) a neighboring distance between access terminal 102 and neighboring access node 404A. Note that, while at times method 300 is explained herein as being carried out with respect to one particular neighboring access node, such as neighboring access node 422A, it should be understood that this is for purposes of example and explanation only. As described further below, method 300 may be carried out with respect to any, or multiple, additional neighboring access node(s) including, for example, neighboring access nodes 404B and/or 404C.

With reference to FIG. 4, serving access node 402 is shown as being serving distance 420 away from access terminal 102. Additionally, each of neighboring access nodes 404A, 404B, and 404C are shown as being neighboring distances 422A, 422B, and 422C, respectively, away from access terminal 102. Note that serving distance 420 is shown as being less than each of neighboring distances 422A, 422B, and 422C. As is typically (but not always) the case, the access node that is closest to access terminal 102 may provide the best signal quality as received by access terminal 102, and therefore may be selected by access terminal 102 to function as its serving access node.

For purposes of calculating the delta, access terminal 102 may determine a distance between itself and an access node, such as any of distances 420, 422A, 422B, and/or 422C, in any suitable manner. As one example, access terminal 102 may determine such a distance based on global positioning system (GPS) information received by access terminal 102 from, for example, a GPS service provider. Such GPS information may specify a distance between access terminal 102 and the access node. Alternatively, such GPS information may specify a location of both access terminal 102 and the access node, and access terminal 102 may be configured to calculate the distance between the specified location of access terminal 102 and the specified location of the access node.

As another example, access terminal 102 may determine a distance between itself and the access node based on a time delay of receipt of signals emitted by the access node. That is, access terminal 102 may determine the time that a particular signal was emitted by the access node (perhaps according to a timestamp encoded in the signal) and the time that the particular signal was received by access terminal 102. Access terminal 102 may be configured to then calculate an amount of time that it took the signal to arrive at access terminal 102 and convert such an amount of time into a distance (perhaps based on a presumed propagation speed of the emitted signal).

As yet another example, access terminal 102 may determine a distance between itself and the access node based on location information provided by the access node in an overhead channel. That is, the access node may encode its location (perhaps in the form of latitude and longitude coordinates) into overhead signals transmitted in an overhead channel and received by access terminal 102. Access terminal 102 may then be configured to calculate the distance between the location of access terminal 102 (which may be known by access terminal 102 based on, for example, GPS information) and the location of the access node.

In any event, once access terminal 102 has determined both the serving distance between itself and serving access node 402 as well as the neighboring distance between itself and neighboring access node 404A, access terminal 102 may calculate a delta of the serving distance and the neighboring distance. As one example, calculating the delta may involve calculating a difference between the serving distance and the neighboring distance. For instance, access terminal 102 may calculate a difference between distance 420 and distance 422A. As another example, calculating the delta may involve calculating a ratio of the serving distance and the neighboring distance. For instance, access terminal 102 may calculate a ratio of distance 420 and distance 422A. As described further below, at step 304, such a delta may be used as a basis for selection of a C/I-evaluation time period.

While, access terminal 102 is described above as determining serving distance 420 and neighboring distance 422, this is not necessary. That is, access terminal 102 may calculate the delta without first determining serving distance 420 and neighboring distance 422A. As one example, access terminal may calculate the delta based on a time-difference-of-arrival (TDOA), relative to the access terminal, of respective signals emitted at the same time by serving access node 402 and neighboring access node 404A. For instance, access terminal 102 may calculate an amount of time between receipt of pilot burst 512 and receipt of pilot burst 522, and then convert such an amount of time into a distance (perhaps based on a presumed propagation speed of the emitted signal). Such a distance could be taken to be the difference in respective distances, or delta, of serving distance 420 and neighboring distance 422A.

In the case that access terminal 102 is neighbored by more than one neighboring access node, it may be desirable for access terminal 102 to calculate the delta with respect to the neighboring access node that is further from access terminal 102 than each of the other neighboring access nodes. By accounting for interfering signals emitted by the neighboring access node that is furthest away from access terminal 102, access terminal 102 can help to ensure that it accounts for interfering signals emitted by all neighboring access nodes. After all, if access terminal 102 has received interfering signals from the neighboring access node that is furthest away from access terminal 102, access terminal 102 presumably will have also received interfering signals from all other, closer, neighboring access nodes.

Before proceeding with additional steps beyond step 302, including selecting a C/I-evaluation time period at step 304, access terminal 102 may first determine that the delta is greater than a distance-delta threshold. In this way, access terminal 102 may help ensure that the difference between serving access node 402 and neighboring access node 404A is not insignificant before devoting resources (e.g., processing cycles, etc.) to carrying out the additional steps of method 300. That is, before proceeding with carrying out the additional steps of method 300, access terminal 102 may first establish that it is likely, or at least possible, that differences in respective distances between the access terminal and various access nodes could be causing access terminal 102 to overestimate the C/I ratio of signals received from serving access node 402. The distance-delta threshold may therefore be set at a value that reflects a non-trivial delta, or a difference in distances at which time delays in receipt of signals may impact C/I estimation. As described above, such a distance-delta threshold may be stored in program data 210 for easy access and reference by access terminal 102.

b. Select Carrier-to-Interference (C/I) Evaluation Time Period

At step 304, access terminal 102 selects a carrier-to-interference (C/I)-evaluation time period based at least in part on the delta calculated in accordance with step 302. In accordance with step 304, access terminal 102 may select the C/I-evaluation time period such that it corresponds to a time period during which access terminal 102 receives pilot bursts from each of serving access node 402 and neighboring access node 404A. Thus, access terminal 102 may select the C/I-evaluation time period such that it coincides with, or is within, the time period of received transmissions 536, during which access node 404A receives both pilot burst 402 and 404A.

Generally, selecting the C/I-evaluation time period may involve selecting as the C/I-evaluation time period a portion of the default C/I-evaluation time period. For example, with reference to FIG. 5 and timing diagram 540, access terminal 102 may select C/I-evaluation time period 542, which is a portion of default C/I-evaluation time period 532 and coincides with received transmissions 536. Further, as described above, default C/I-evaluation time period 532, may correspond to a pilot-burst time period defined by the wireless-communication protocol according to which the wireless-communication network is operating. Thus, selecting C/I-evaluation time period 542 may generally involve selecting a portion of a pilot-burst time period.

The particular duration and period of C/I-evaluation time period 542 may be selected in any suitable manner. In some arrangements, access terminal 102 may be configured to determine a desired duration of the C/I-evaluation time period, and then may select the C/I-evaluation time period to be a corresponding period of time occurring at the end of the default C/I-evaluation time period (so as to allow as much time as possible for receiving signals before making C/I measurements). Because the time difference in receipt of signals is a function of distance, access terminal 102 may base a selection of the C/I-measurement time period on the delta calculated in accordance with step 302.

As one example, the C/I-evaluation time period may be selected such that a ratio of serving distance 420 to neighboring distance 422A equals a ratio of C/I-evaluation time period 542 to default C/I-evaluation time period 532. In this way, access terminal 102 may select the C/I-evaluation time period in a manner that directly accounts for the difference between distances 420 and 422A, and therefore is likely to exclude periods of time during which not all signals have been received from access node 402 and 404A.

As another example, the C/I-evaluation time period may be selected such that a time difference-of-arrival (TDOA), relative to the access terminal, of serving-access-node signals and neighboring-access-node signals equals a time difference between the default C/I-evaluation time period and the C/I-evaluation time period. In this way, access terminal 102 may help ensure that the duration of the selected portion of the default C/I-evaluation time period reflects the time difference in receipt of respective signals emitted by access node 402 and access node 404A. Given that the TDOA is a function of the respective distances of serving access node 402 and neighboring access node 404A from access terminal 102A, basing the selection of the C/I-evaluation time period on TDOA accounts for the difference between distances 420 and 422A.

As yet another example, the C/I-evaluation time period may be selected such that the C/I-evaluation time period has a duration that is a pre-determined amount of time less than that of the default C/I-evaluation time period. For instance, access terminal 102 may select the C/I-evaluation time period to be the second half of the default C/I-evaluation time period. As shown in FIG. 5, C/I-evaluation time period 542 has been selected to be time slots T3-T4, which is the second half of default C/I-evaluation time period 532. The C/I-evaluation time period may be selected to be other pre-determined amounts of time less in duration than that of the default C/I-evaluation time period as well.

As another example, the C/I-evaluation time period may be selected such that a pre-determined number of C/I-measurements are excluded from the C/I-evaluation time period. For instance, as shown in FIG. 5, access terminal 102 may select the C/I-evaluation time period such that one half (for example, the first half) of C/I measurements taken by access terminal 102 in accordance with a default C/I-evaluation time period are excluded. According to FIG. 5, C/I-evaluation time period 542 has been selected to be time slots T3-T4, which excludes the first half of C/I measurements taken by access terminal 102 (C/I measurements 534A and 534B) from the C/I-evaluation time period. The C/I-evaluation time period may be selected so as to exclude other numbers of C/I measurements as well.

Further, while method 300 has been described above with respect to C/I measurements that have already been taken by access terminal 102 in accordance with default C/I-evaluation time period 532, this is not necessary. For instance, access terminal 102 may carry out at least steps 302 and 304, including selecting a C/I-evaluation time period, prior to making any C/I measurements. Access terminal 102 may then take C/I measurements during the C/I-evaluation time period, and not necessarily at any other time. In this way, access terminal 102 may, in effect, exclude any C/I measurements that might have otherwise been taken during default C/I-evaluation time period 532 by not making such C/I measurements in the first place.

c. Determine Estimated C/I Ratio of Received Signal

At step 306, access terminal 102 determines an estimated C/I ratio of a signal received from the serving access node based at least in part on one or more C/I measurements taken by the access terminal during the C/I-evaluation time period, and not based on any C/I measurement taken by the access terminal at a time other than during the C/I-evaluation time period.

Generally, estimating the C/I ratio may involve any suitable analysis of any combination of C/I measurements taken during the C/I-evaluation time period. As one example, the estimated C/I ratio may be determined based at least in part on an average of all C/I measurements taken during the C/I-evaluation time period. For instance, access terminal 102 may take the estimated C/I ratio to be an average of C/I measurements 534C and 534D.

As another example, the estimated C/I ratio may be determined based at least in part on the median C/I measurement taken during the C/I-evaluation time period. For instance, access terminal 102 may take the estimated C/I ratio to be the median of C/I measurements 534C and 534D (which, in the case of two C/I measurements may be equal to the average of the C/I measurements, but otherwise may not be equal to an average of C/I measurements taken during the C/I-evaluation time period).

As yet another example, the estimated C/I ratio may be determined based at least in part on the minimum C/I measurement taken during the C/I-evaluation time period. For instance, access terminal 102 may take the estimated C/I ratio to be that which is the least of C/I measurements 534C and 534D.

As yet another example still, the estimated C/I ratio may be determined based at least in part on the maximum C/I measurement taken during the C/I-evaluation time period. For instance, access terminal 102 may take the estimated C/I ratio to be that which is the greatest of C/I measurements 534C and 534D.

While various examples of ways in which access terminal 102 may determine an estimated C/I ratio are provided above, this listing of examples should not be taken to be limiting. Other manners, methods, or techniques of determining an estimated C/I ratio based on C/I measurements taken during C/I-evaluation time period 542 may be possible as well.

d. Select Forward-Link Data Rate

At step 308, access terminal 102 selects a forward-link data rate based at least in part on the estimated C/I ratio. For example, access terminal may be configured to select a forward-link data rate that is associated with the estimated C/I ratio. As described above, program data 210 may include data-rate data that correlates particular forward-link data rates with particular C/I ratios. Thus, access terminal 102 may store various forward-link data rates that have been pre-determined to be desirable for use upon access terminal 102 estimating a particular C/I ratio. Accordingly, access terminal 102 may be arranged to select the stored forward-link data rate that most closely corresponds with the estimated C/I ratio. Alternatively, access terminal 102 may be configured to calculate a forward-link data rate based on the estimated C/I ratio and select such a calculated forward-link data rate. As noted above, in the context of EV-DO, the selected forward-link data rate may be represented by, i.e. associated with, a data-rate control (DRC) value.

e. Request Forward-Link Service

At step 310, access terminal 102 requests forward-link service from the serving access node at the selected forward-link data rate. That is, after selecting the forward-link data rate, access terminal 102 may send a message to serving access node 402 requesting that serving access node 402 use the selected forward-link data rate for sending communications to access terminal 102. Access node 402 may, if possible, then serve access terminal 102 at the requested selected forward-link data rate.

3. Conclusion

Various exemplary embodiments have been described above. Those skilled in the art will understand, however, that changes and modifications may be made to those examples without departing from the scope of the claims.

The invention claimed is:

1. In a wireless-communication network comprising an access terminal that is being served by a serving access node, the network further comprising a neighboring access node, a method comprising:

the access terminal calculating a delta of (i) a serving distance between the access terminal and the serving access node and (ii) a neighboring distance between the access terminal and the neighboring access node;

the access terminal selecting a carrier-to-interference (C/I)-evaluation time period based at least in part on the calculated delta;

the access terminal determining an estimated C/I ratio of a signal received from the serving access node based at least in part on one or more C/I measurements taken by the access terminal during the C/I-evaluation time period, and not based on any C/I measurement taken by the access terminal at a time other than during the C/I-evaluation time period;

the access terminal selecting a forward-link data rate based at least in part on the estimated C/I ratio; and the access terminal requesting forward-link service from the serving access node at the selected forward-link data rate.

2. The method of claim 1, wherein the access terminal calculates the delta responsive to determining that a forward packet error rate (FPER) with respect to data received from the serving access node is greater than an FPER threshold.

3. The method of claim 1, wherein the access terminal selects the C/I-evaluation time period responsive to determining that the delta is greater than a delta threshold.

4. The method of claim 1, wherein calculating the delta comprises at least one of (i) calculating a difference between the serving distance and the neighboring distance and (ii) calculating a ratio of the serving distance and the neighboring distance.

5. The method of claim 1, wherein selecting the C/I-evaluation time period comprises selecting as the C/I-evaluation time period a portion of a default C/I-evaluation time period.

6. The method of claim 5, wherein the default C/I-evaluation time period has a duration substantially equal to that of a pilot burst received from the serving access node.

7. The method of claim 5, wherein the C/I-evaluation time period is selected such that (i) a ratio of the serving distance to the neighboring distance equals a ratio of the C/I-evaluation time period to the default C/I-evaluation time period, (ii) a time-difference-of-arrival (TDOA), relative to the access terminal, of serving-access-node signals and neighboring-access-node signals equals a time difference between the default C/I-evaluation time period and the C/I-evaluation time period, (iii) the C/I-evaluation time period has a duration that is a pre-determined amount of time less than that of the default C/I-evaluation time period, and/or (iv) a pre-determined number of C/I measurements are excluded from the C/I-evaluation time period.

8. The method of claim 1, wherein the estimated C/I ratio is determined based at least in part on at least one of (i) an average of all C/I measurements taken during the C/I-evaluation time period, (ii) the median C/I measurement taken during the C/I-evaluation time period, (iii) the minimum C/I measurement taken during the C/I-evaluation time period, and (iv) the maximum C/I measurement taken during the C/I-evaluation time period.

9. The method of claim 1, wherein one or both of the serving distance and the neighboring distance is determined based on at least one of (i) global positioning system (GPS) information, (ii) a time delay of receipt of signals emitted by the serving access node and the neighboring access node, respectively, and (iii) location information provided in an overhead channel by the corresponding access node.

10. The method of claim 1, wherein the wireless-communication network further comprises a plurality of additional neighboring access nodes, the method further comprising:

prior to calculating the delta, the access terminal determining that the neighboring access node is further from the access terminal than each of the at least one additional neighboring access nodes.

11. The method of claim 1, wherein the selected forward-link data rate is associated with a data-rate control (DRC) value.

12. An access terminal that is being served by an access node in a wireless-communication network, the network further comprising a neighboring access node, the access terminal comprising:

a wireless-communication interface;
a processor; and
data storage comprising program instructions executable by the processor for causing the mobile device to carry out functions including:

calculating a delta of (i) a serving distance between the access terminal and the serving access node and (ii) a neighboring distance between the access terminal and the neighboring access node;

selecting a carrier-to-interference (C/I)-evaluation time period based at least in part on the calculated delta;

determining an estimated C/I ratio of a signal received from the serving access node based at least in part on one or more C/I measurements taken by the access terminal during the C/I-evaluation time period, and not based on any C/I measurement taken by the access terminal at a time other than during the C/I-evaluation time period;

selecting a forward-link data rate based at least in part on the estimated C/I ratio; and requesting forward-link service from the serving access node at the selected forward-link data rate.

13. The access terminal of claim 12, the data storage further comprising instructions for:

calculating the delta responsive to determining that a forward packet error rate (FPER) with respect to data received from the serving access node is greater than an FPER threshold.

14. The access terminal of claim 12, the data storage further comprising instructions for:

selecting the C/I-evaluation time period responsive to determining that the delta is greater than a delta threshold.

15. The access terminal of claim 12, wherein calculating the delta comprises at least one of (i) calculating a difference between the serving distance and the neighboring distance and (ii) calculating a ratio of the serving distance and the neighboring distance.

16. The access terminal of claim 12, wherein selecting the C/I-evaluation time period comprises selecting as the C/I-evaluation time period a portion of a default C/I-evaluation time period.

17. The access terminal of claim 16, wherein the default C/I-evaluation time period has a duration substantially equal to that of a pilot burst received from the serving access node.

18. The access terminal of claim 16, wherein the estimated C/I ratio is determined based at least in part on at least one of (i) a ratio of the serving distance to the neighboring distance equals a ratio of the C/I-evaluation time period to the default C/I-evaluation time period, (ii) a time-difference-of-arrival (TDOA), relative to the access terminal, of serving-access-node signals and neighboring-access-node signals equals a time difference between the default C/I-evaluation time period and the C/I-evaluation time period, (iii) the C/I-evaluation time period has a duration that is a pre-determined amount of time less than that of the default C/I-evaluation time period, and/or (iv) a pre-determined number of C/I measurements are excluded from the C/I-evaluation time period.

19. The access terminal of claim 12, wherein determining the estimated C/I ratio is further based on at least one of (i) an average of all C/I measurements taken during the C/I-evaluation time period, (ii) the median C/I measurement taken during the C/I-evaluation time period, (iii) the minimum C/I measurement taken during the C/I-evaluation time period, and (iv) the maximum C/I measurement taken during the C/I-evaluation time period.

20. The access terminal of claim 12, wherein one or both of the serving distance and the neighboring distance is determined based on at least one of (i) global positioning system (GPS) information, (ii) a time delay between receipt of signals emitted by the serving access node and the neighboring access node, respectively, and (iii) location information provided in an overhead channel by the corresponding access node.

21. The access terminal of claim 12, wherein the wireless-communication network further comprises a plurality of additional neighboring access nodes, the data storage further comprising instructions for:

prior to calculating the delta, the access terminal determining that the neighboring access node is further from the access terminal than each of the at least one additional neighboring access nodes.

22. The access terminal of claim 12, wherein the selected forward-link data rate is associated with a data-rate control (DRC) value.

* * * * *